United States Patent
Ryu et al.

(10) Patent No.: US 10,129,493 B2
(45) Date of Patent: Nov. 13, 2018

(54) RADIATION IMAGING APPARATUS AND CONTROL METHOD OF THE SAME

(71) Applicant: CANON KABUSHIKI KAISHA, Tokyo (JP)

(72) Inventors: Takuya Ryu, Kokubunji (JP); Tomoyuki Yagi, Chofu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 15/181,721

(22) Filed: Jun. 14, 2016

(65) Prior Publication Data

US 2016/0366351 A1 Dec. 15, 2016

(30) Foreign Application Priority Data

Jun. 15, 2015 (JP) ................................. 2015-120550

(51) Int. Cl.
*H04N 5/359* (2011.01)
*H04N 5/378* (2011.01)
*H04N 5/232* (2006.01)
*H04N 5/32* (2006.01)
*H01J 37/22* (2006.01)

(52) U.S. Cl.
CPC ......... *H04N 5/3597* (2013.01); *H01J 37/222* (2013.01); *H04N 5/23245* (2013.01); *H04N 5/32* (2013.01); *H04N 5/378* (2013.01); *H01J 2237/221* (2013.01)

(58) Field of Classification Search
CPC .... H04N 5/3597; H04N 5/23245; H04N 5/32; H04N 5/378; H01J 37/222; H01J 2237/221
See application file for complete search history.

(56) References Cited

U.S. PATENT DOCUMENTS

| | | | | |
|---|---|---|---|---|
| 6,061,092 A | * | 5/2000 | Bakhle | H04N 5/232 348/243 |
| 6,144,408 A | * | 11/2000 | MacLean | H04N 5/361 348/241 |
| 2002/0167600 A1 | * | 11/2002 | Baer | H04N 1/00132 348/231.9 |
| 2003/0112473 A1 | * | 6/2003 | Robins | H04N 5/361 358/463 |

(Continued)

FOREIGN PATENT DOCUMENTS

JP 2010-042150 A 2/2010

*Primary Examiner* — Timothy J Henn
(74) *Attorney, Agent, or Firm* — Carter, DeLuca, Farrell & Schmidt, LLP (57) ABSTRACT

A radiation imaging apparatus, comprising a sensor array, a readout unit, for reading out image data from the sensor array, which includes a first mode of reading out image data in a first period and a second mode of reading out image data in a second period shorter than the first period, a holding unit and a controlling unit, wherein, after irradiation to the sensor array is complete, the controlling unit performs first control which causes the holding unit to hold image data read out in the second mode while the sensor array is not irradiated, as offset data for the second mode, and then, performs second control which causes the holding unit to hold image data read out in the first mode while the sensor array is not irradiated, as offset data for the first mode.

15 Claims, 5 Drawing Sheets (56) References Cited

U.S. PATENT DOCUMENTS

| | | | |
|---|---|---|---|
| 2003/0214590 A1* | 11/2003 | Matherson | H04N 5/361 348/243 |
| 2004/0051797 A1* | 3/2004 | Kelly | H04N 5/361 348/244 |
| 2004/0113052 A1* | 6/2004 | Johanneson | G06T 9/005 250/214 R |
| 2004/0183928 A1* | 9/2004 | Tay | H04N 5/335 348/244 |
| 2005/0195296 A1* | 9/2005 | Compton | H04N 5/361 348/243 |
| 2007/0103571 A1* | 5/2007 | Itoh | H04N 5/23245 348/252 |
| 2008/0055431 A1* | 3/2008 | Alakarhu | H04N 5/361 348/241 |
| 2009/0244331 A1* | 10/2009 | Suzuki | H04N 5/361 348/243 |
| 2012/0075506 A1* | 3/2012 | van Beek | H04N 5/2173 348/241 |
| 2014/0061488 A1 | 3/2014 | Sato et al. | |
| 2014/0061494 A1 | 3/2014 | Sato et al. | |
| 2014/0061495 A1 | 3/2014 | Yagi et al. | |
| 2014/0320685 A1 | 10/2014 | Takenaka et al. | |

* cited by examiner

RADIATION IMAGING APPARATUS AND CONTROL METHOD OF THE SAME

BACKGROUND OF THE INVENTION

Field of the Invention

The present invention relates to a radiation imaging apparatus and a control method of the same.

Description of the Related Art

A radiation imaging apparatus includes a sensor array for detecting radiation, a readout unit for reading out image data from the sensor array, and a processing unit for processing the image data. The processing unit performs, for example, offset correction for removing an offset component (noise component) from the image data. More specifically, this offset correction is performed by using image data (to be referred to as "offset data" hereinafter) read out from the sensor array while the sensor array is not irradiated. The offset data is obtained before offset correction is performed, and updated if the environment changes (for example, if the temperature changes or a predetermined time elapses).

When obtaining offset data after radiation imaging, a signal component of the radiation imaging may remain as an image lag (a residual image) in the offset data. Japanese Patent Laid-Open No. 2010-42150 has disclosed a technique of determining whether an image lag remains in image data, and employing the image data as offset data if no image lag remains.

Some radiation imaging apparatuses have a plurality of operation modes different from each other in time required to obtain image data of one frame (or an obtained frame count (frame rate) per unit time). In a radiation imaging apparatus like this, an offset component contained in image data changes when the operation mode is changed. Therefore, offset correction is performed by using offset data corresponding to each operation mode. This requires a technique which obtains (or updates) offset data for each operation mode within a short time.

SUMMARY OF THE INVENTION

The present invention provides a technique advantageous in shortening a time required to obtain offset data for each operation mode in a radiation imaging apparatus having a plurality of operation modes.

One of the aspects of the present invention provides a radiation imaging apparatus, comprising a sensor array configured to detect radiation, a readout unit configured to read out image data from the sensor array, and including, as operation modes, a first mode of reading out image data of one frame in a first period, and a second mode of reading out image data of one frame in a second period shorter than the first period, a holding unit, and a controlling unit, wherein after irradiation to the sensor array is complete, the controlling unit performs first control which causes the holding unit to hold, as offset data for the second mode, image data read out in the second mode by the readout unit from the sensor array while the sensor array is not irradiated, and performs, after the first control, second control which causes the holding unit to hold, as offset data for the first mode, image data read out in the first mode by the readout unit from the sensor array while the sensor array is not irradiated.

Further features of the present invention will become apparent from the following description of exemplary embodiments with reference to the attached drawings.

DESCRIPTION OF THE EMBODIMENTS

Configuration Example of Imaging System

Figure 1:
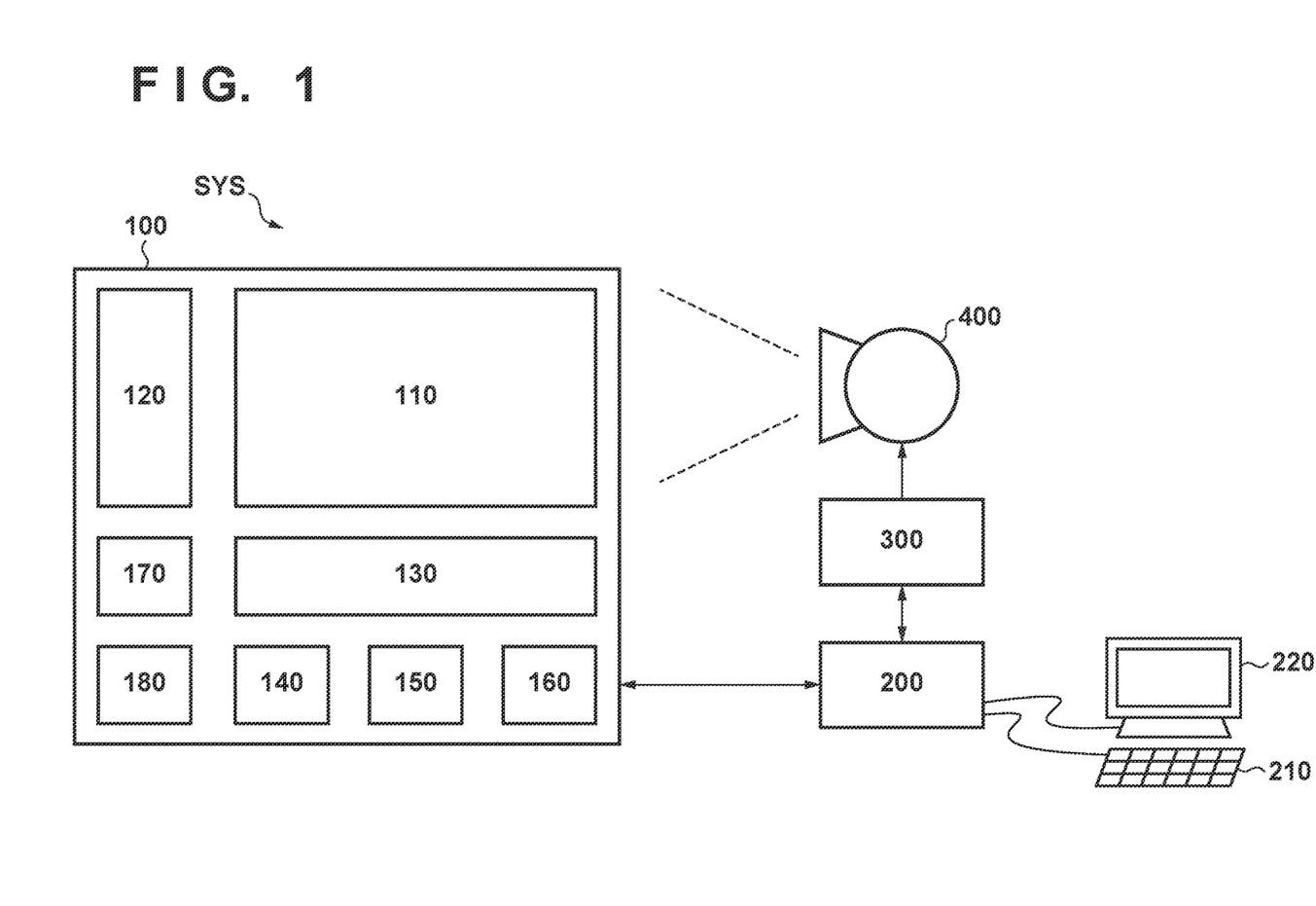
FIG. 1 is a view for explaining a configuration example of an imaging system.

FIG. 1 shows a configuration example of an imaging system SYS such as a radiation examining apparatus. The imaging system SYS includes a radiation imaging apparatus 100, a processor 200, a radiation controller 300, and a radiation source 400. The processor 200 controls the radiation imaging apparatus 100 and radiation controller 300 based on, for example, imaging conditions input by the user via a terminal 210. The radiation controller 300 drives the radiation source 400 based on a signal from the processor 200, and the driven radiation source 400 generates radiation (for example, an X-ray, α-ray, or β-ray). The radiation is transmitted through an object to be examined (not shown), and the radiation imaging apparatus 100 detects this radiation containing information of the object to be examined. The radiation imaging apparatus 100 generates image data based on the detected radiation, and outputs the image data to the processor 200. The processor 200 outputs a radiation image based on the image data to a display unit 220 such as a display.

The radiation imaging apparatus 100 includes a sensor array 110, a driving unit 120, a readout unit 130, a processing unit 140, a holding unit 150, a communication unit 160, a controlling unit 170, and a power supply unit 180.

The sensor array 110 includes a plurality of sensors so arranged as to form a plurality of rows and a plurality of columns on a substrate. Each sensor is a detecting element for detecting radiation. For example, it is possible to use a PIN sensor or MIS sensor formed by amorphous silicon on an insulating substrate such as a glass substrate. In this case, a scintillator for converting radiation into light can be arranged on the side of an irradiation surface of the sensor array 110.

The driving unit 120 drives the sensors of the sensor array 110 row by row. The driving unit 120 includes a scanning circuit formed by using, for example, shift registers, and sequentially selectively drives the sensors on each row. The readout unit 130 reads out image data from the sensor array 110. More specifically, the readout unit 130 reads out a signal from each of a plurality of sensors driven by the driving unit 120. The value of this signal corresponds to the radiation dose detected by the corresponding sensor. In this example, the signal value corresponds to the quantity of light having entered the corresponding sensor from the scintillator.

The processing unit 140 is formed by an integrated circuit such as an ASIC, and performs data processing such as a correction process on image data read out by the readout unit 130. As will be described in detail later, the processing unit 140 performs offset correction, by using offset data, on image data read out from the irradiated sensor array 110.

The holding unit 150 is a memory for holding image data, and it is possible to use, for example, a volatile memory such as a DRAM, a nonvolatile memory such as a flash memory, or another known storage means. The communication unit 160 is an external interface for exchanging signals and data with the processor 200, and it is possible to use a wired communicating means or wireless communicating means. The communication unit 160 may also exchange signals and data with another unit (not shown).

To properly perform radiation imaging, the controlling unit 170 controls the operations of the abovementioned units forming the radiation imaging apparatus 100, for example, controls synchronization of these units by using a reference signal such as a clock signal. The power supply unit 180 supplies electric power to each unit so that the unit properly operates. For example, the power supply unit 180 generates one or more voltages based on external electric power, and supplies each generated voltage to a corresponding unit.

The configurations of the imaging system SYS and radiation imaging apparatus 100 are not limited to the above-described examples, and the arrangements of the aforementioned units can appropriately be changed. For example, a part of the function of a given unit may also be achieved by another unit, and the functions of two more units may also be achieved by one unit. For example, a part of the function of the processing unit 140 may also be implemented by the processor 200, and the processing unit 140 and processor 200 may also be formed by a single unit.

(Configuration Example of Sensor Array and Readout Unit)

Figure 2:
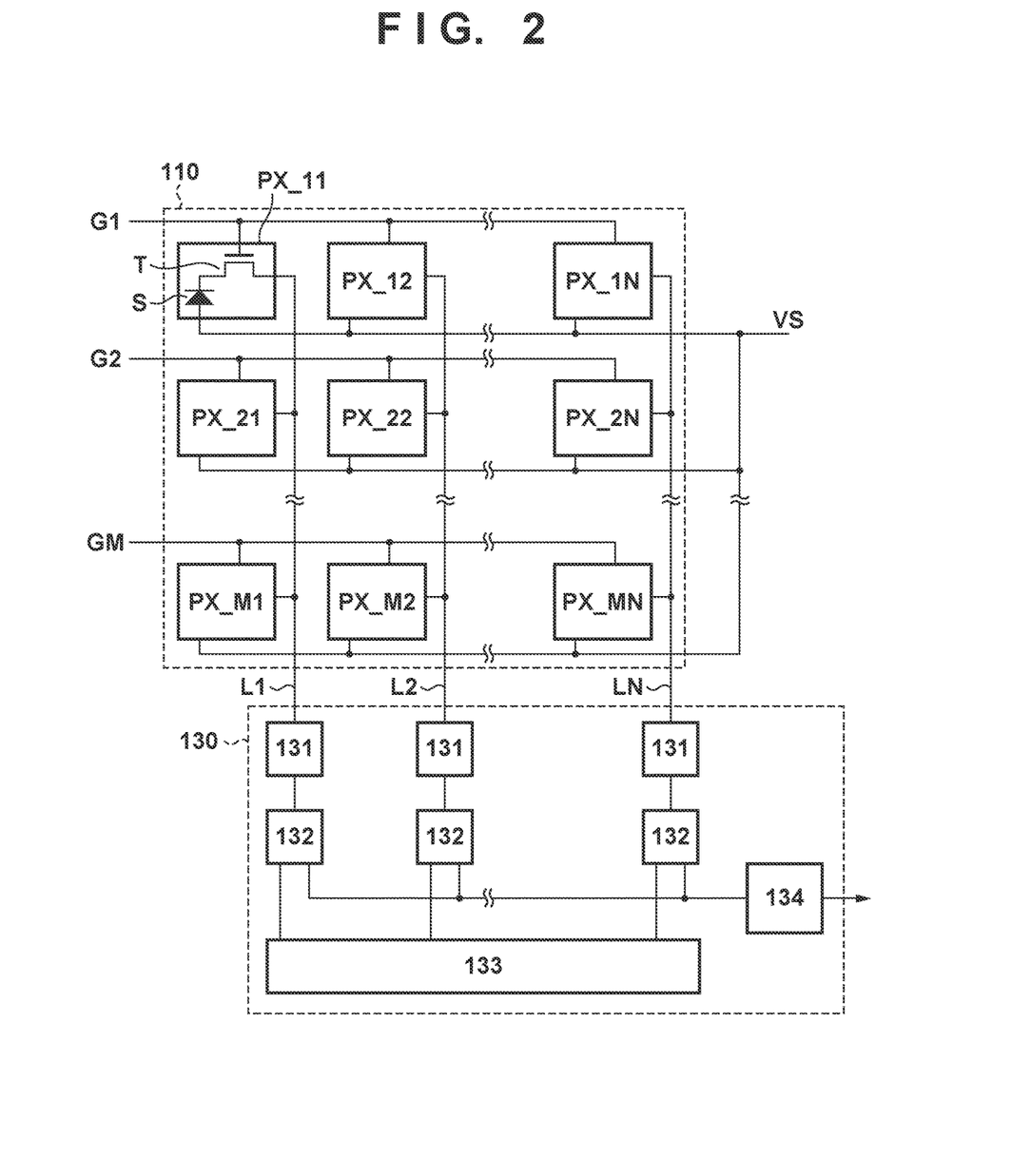
FIG. 2 is a view for explaining a configuration example of a radiation imaging apparatus.

FIG. 2 shows a configuration example of the sensor array 110 and read out unit 130. In this example, the sensor array 110 includes a plurality of sensors PX (PX_11, PX_12, . . . , PX_MN) so arranged as to form M rows and N columns. The sensor PX may also be referred to as a "pixel".

For example, the sensor PX_11 positioned in the first row and first column includes a photoelectric conversion element S and thin-film transistor T. For example, one terminal of the photoelectric conversion element S is connected to the thin-film transistor T, and the other terminal thereof is connected to a power line for propagating a reference voltage VS received from the power supply unit 180. The thin-film transistor T is turned on or off in response to a signal received from the driving unit 120 via a signal line G1. While the thin-film transistor T is kept off, electric charge is stored in the photoelectric conversion element S. When the thin-film transistor T is turned on, a signal corresponding to the amount of accumulated charge is transferred to the readout unit 130 via a corresponding column signal line L1. This applies to other sensors PX_12, . . . , PX_MN.

The readout unit 130 includes signal amplifying units 131, sampling units 132, a scanning circuit 133, and an output unit 134. The signal amplifying units 131 are arranged in one-to-one correspondence with the columns, and each amplify signals from corresponding sensors PX. For example, the signal amplifying unit 131 can include an integral amplifier, a variable amplifier, or another known signal amplifying circuit. The sampling units 132 are arranged in one-to-one correspondence with the columns, and each sample a signal from a corresponding signal amplifying unit 131. The sampling unit 132 can include a switching element and capacitor, and can further include a buffer amplifier for amplifying the sampled signal. The scanning circuit 133 is formed by using shift registers or the like, and supplies a control signal to the sampling unit 132 corresponding to each column. In response to this control signal from the scanning circuit 133, the sampling unit 132 transfers the sampled signal to the output unit 134. The output unit 134 includes an output circuit for outputting the sampled signal to an external unit (for example, the processing unit 140). For example, the output unit 134 can include a buffer amplifier and A/D converter.

The processing unit 140 processes the signals from the plurality of sensors PX read out by the readout unit 130, as image data of one frame. That is, image data of one frame is obtained by reading out signals from the plurality of sensors PX once.

When the readout unit 130 reads out image data, a time required to obtain image data of one frame (or an obtained frame count (frame rate) per unit time) can be changed in accordance with the imaging conditions. In other words, the readout unit 130 has, as operation modes, a plurality of modes different from each other in time required to obtain image data of one frame. For example, the readout unit 130 can have a first mode of reading out image data of one frame in a first period, and a second mode of reading out image data of one frame in a second period shorter than the first period. That is, the first mode is a low-frame-rate readout mode, and the second mode is a high-frame-rate readout mode. In this case, the charge accumulation time (the period in which the thin-film transistor T is kept off) of each sensor PX in the second mode is shorter than that of each sensor PX in the first mode. From this point of view, the driving unit 120 can be included in the readout unit 130. The readout unit 130 has the first and second modes in this example, but may also have three or more modes (may further include another mode).

(Operation Example of Radiation Imaging Apparatus in Radiation Imaging)

Figure 3:
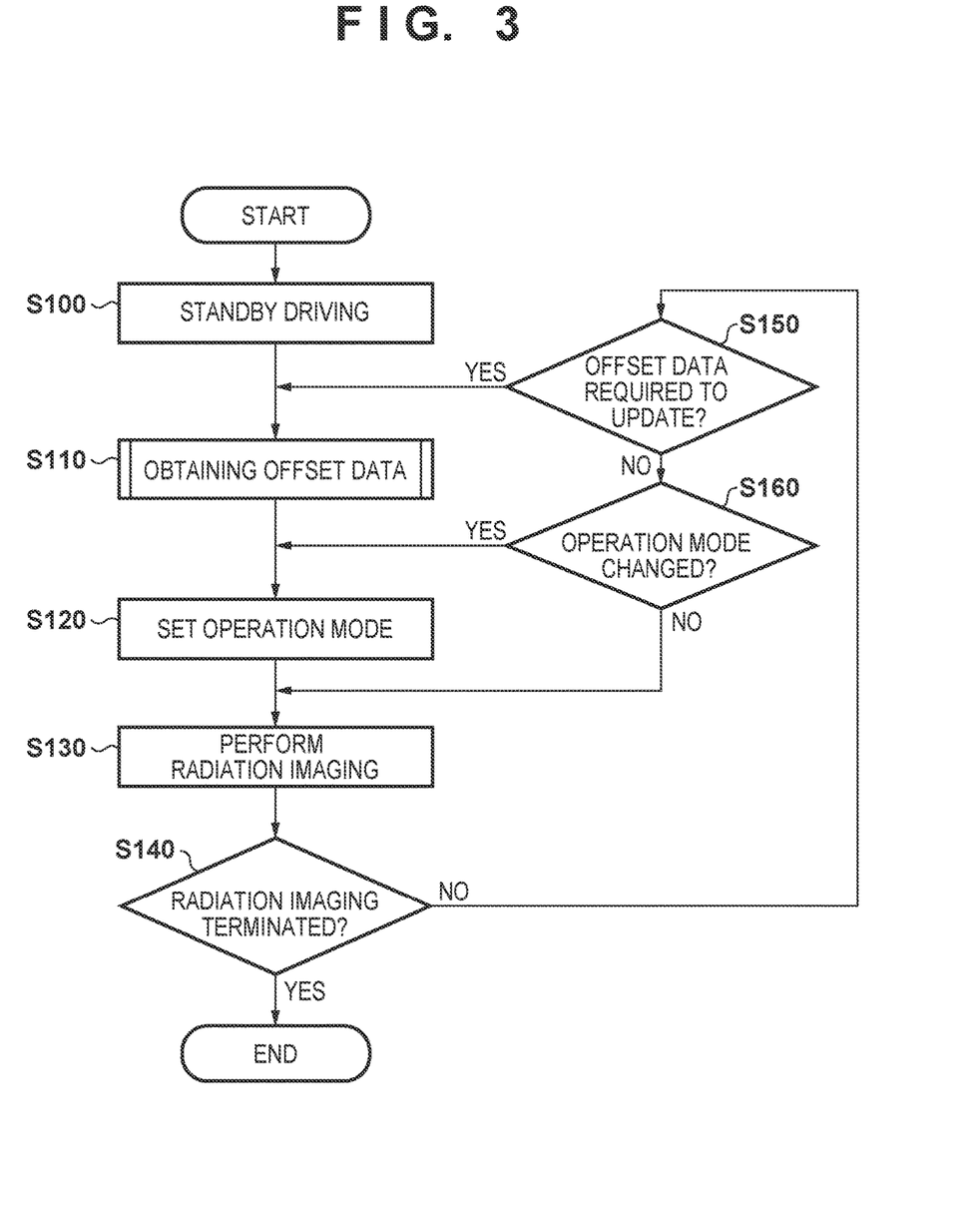
FIG. 3 is a flowchart for performing radiation imaging.

FIG. 3 is a flowchart for explaining an operation example of the radiation imaging apparatus 100 when performing radiation imaging. In step S100 (to be simply referred to as "S100" hereinafter; this applies to other steps), the radiation imaging apparatus 100 is activated, and standby driving for activating each unit of the radiation imaging apparatus 100 is performed. For example, based on a control signal from the controlling unit 170, the power supply unit 180 applies a voltage generated based on external electric power to a corresponding unit. After that, a resetting process of initializing the potential of the photoelectric conversion element S can be performed in each sensor PX of the sensor array 110 based on a signal from the driving unit 120. In this example, the resetting process can be performed by turning on the thin-film transistor T in a state in which, for example, the column signal line L1 is fixed to a constant potential.

In S110, offset data to be used when performing offset correction on image data is obtained. The offset data is image data read out from the sensor array 110 which is not irradiated, and can also be referred to as dark image data. The offset data is obtained for each of the plurality of modes described above. That is, in this step, offset data for the above-described first and second modes are obtained. Details of this step will be described later.

In S120, the operation mode is set based on imaging conditions input by the user via the terminal 210. For example, the second mode as the high-frame-rate readout mode can be set when smoothly playing back a moving image, and the first mode as the low-frame-rate readout mode can be set when giving priority to resolution for the purpose of, for example, observing details of a diseased part.

Note that the user may also input an instruction for changing the operation mode to the terminal 210 at an arbitrary timing. In response to this input, the operation mode can be changed at an appropriate timing. For example, the operation mode can be changed after image data of a given frame is read out and before image data of the next frame is read out, and can also be changed by interrupting image data readout currently being executed.

In S130, radiation imaging is performed by the operation mode set in S120. This step may also be started when, for example, the radiation imaging apparatus 100 detects radiation from the radiation source 400. In this case, the radiation imaging apparatus 100 may also include a sensing unit for sensing the start of emission of radiation. This sensing by the sensing unit can be performed based on a change amount of an electric current of the reference voltage VS of the sensor array 110, and can also be performed by a sensor different from the sensor PX, having the same structure as that of the sensor PX, and provided with a dedicated readout unit.

Note that before radiation imaging is started, the above-described resetting process (the operation of initializing the potential of the photoelectric conversion element S) can repetitively be performed in each sensor PX of the sensor array 110. This reduces a noise component caused by a dark current in each sensor PX.

In S140, whether to terminate radiation imaging is determined. If NO in S140 (for example, when continuing moving image radiation imaging or continuous radiation imaging), the process advances to step S150.

In S150, whether to update the offset data is determined. If update is necessary, the process advances to S110; if not, the process advances to S160. For example, if a considerable time has elapsed since radiation imaging is started, the environment (for example, the temperature) of the radiation imaging apparatus 100 (particularly the sensor array 110) may have changed, so the offset component in the image data can change. Therefore, the offset data is preferably updated if a predetermined condition is met (for example, if a predetermined time has elapsed or the temperature has changed).

Determining whether to update the offset data can be performed by input to the terminal 210 by the user, and can also be performed by a predetermined determining means of the radiation imaging apparatus 100. For example, the radiation imaging apparatus 100 can further include a timer. This timer measures the time having elapsed since the offset data is obtained or lastly updated, and the offset data is updated if a predetermined time has elapsed. In another example, the radiation imaging apparatus 100 may further include a temperature measuring unit arranged in the sensor array 110 and/or its vicinity. The offset data is updated if the change amount of a measurement value obtained by this temperature measuring unit since the offset data is obtained or lastly updated has exceeded a predetermined value.

In S160, whether to change the operation mode is determined. If it is unnecessary to change the operation mode, the process advances to S130. If it is necessary to change the operation mode, the process advances to S120.

(Image Lag in Offset Data)

An image lag in offset data will be described below with reference to FIGS. 4 and 5. When obtaining offset data after image data is read out from the sensor array 110 in response to irradiation, a portion (image lag) of the image data may remain in the offset data. This is equivalent to a state in which electric charge (electric charge equivalent to a signal component) not erased by the resetting process performed after the image data is read out and before the offset data is read out remains in each sensor PX. The amount of this image lag depends on the elapsed time from the completion of the irradiation.

Figure 4:
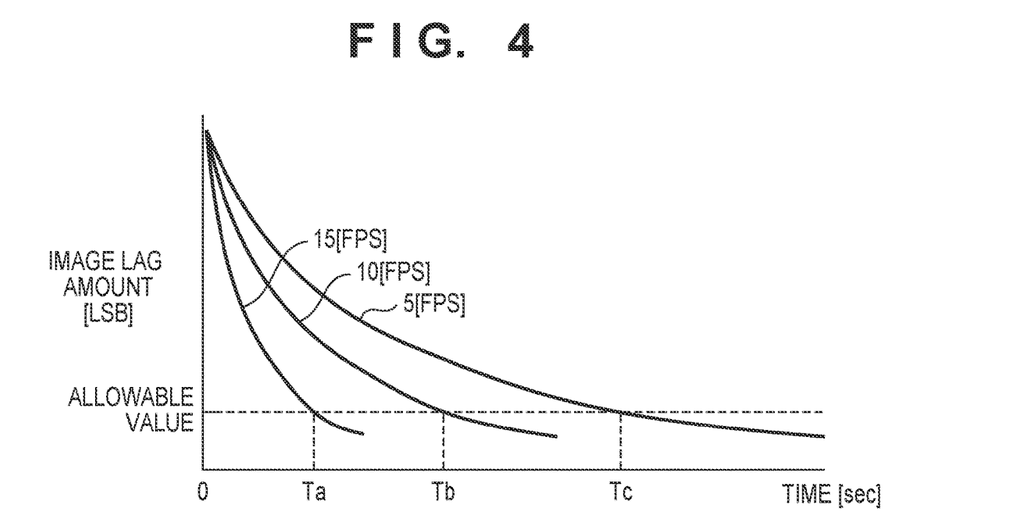
FIG. 4 is a view for explaining the dependence of an image lag amount on elapsed time in image data.

FIG. 4 is a graph showing the dependence of the image lag amount on the elapsed time in the offset data. This graph is obtained by repetitively reading out image data at a desired frame rate from the sensor array 110 which is not irradiated, and plotting the image lag amount in the image data. In this graph, the ordinate represents the image lag amount [LSB], the abscissa represents the elapsed time [sec] from the completion of irradiation, and image lag amounts when the frame rates are 15, 10, and 5 [FPS] are plotted. A time required for the image lag amount to become smaller than an allowable value prolongs as the frame rate decreases. This time is time Ta for 15 [FPS], time Tb (>Ta) for 10 [FPS], and time Tc (>Tb) for 5 [FPS].

Figure 5:
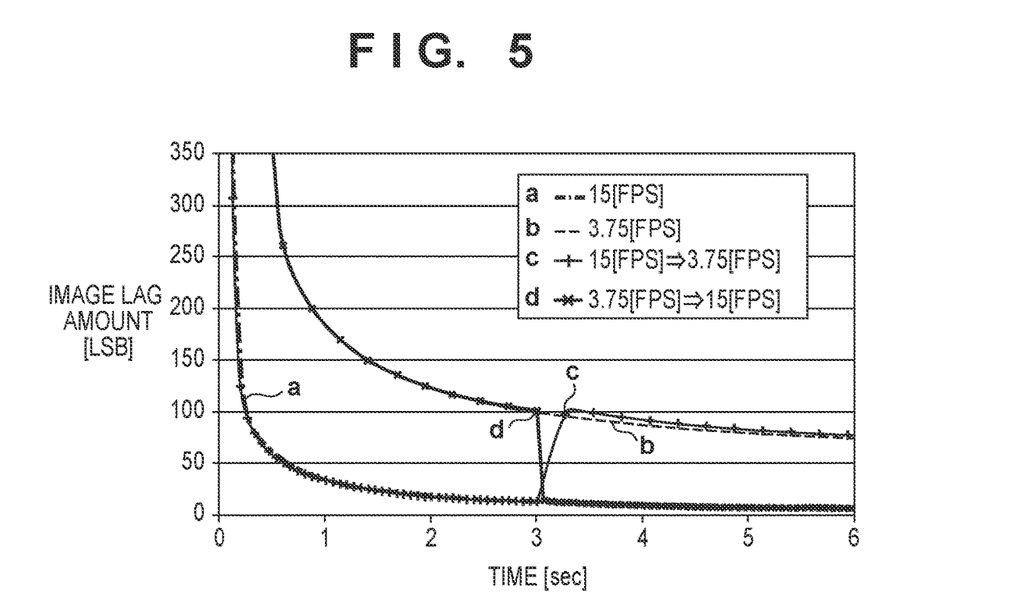
FIG. 5 is a view for explaining the dependence of an image lag amount on elapsed time in image data.

FIG. 5 is a graph for explaining the dependence of the image lag amount on the elapsed time in the offset data from another viewpoint. FIG. 5 shows the plot (indicated by (a)) of the image lag amount at a frame rate of 15 [FPS], the plot (indicated by (b)) of the image lag amount at a frame rate of 3.75 [FPS], the plot (indicated by (c)) of the image lag amount when the frame rate is changed from 15 to 3.75 [FPS], and the plot (indicated by (d)) of the image lag amount when the frame rate is changed from 3.75 to 15 [FPS].

Comparison of plot (a) corresponding to 15 [FPS] (a high frame rate) with plot (b) corresponding to 3.75 [FPS] (a low frame rate) shows that the image lag amount of plot (a) reduces faster than that of plot (b), as described above with reference to FIG. 4.

On the other hand, plot (c) is practically the same as plot (a) before the frame rate is changed (when the frame rate is 15 [FPS]), and practically the same as plot (b) after the frame rate is changed (when the frame rate is 3.75 [FPS]). Also, plot (d) is practically the same as plot (b) before the frame rate is changed (when the frame rate is 3.75 [FPS]), and practically the same as plot (a) after the frame rate is changed (when the frame rate is 15 [FPS]).

This reveals that even when the frame rate is changed while obtaining offset data, the image lag amount in the offset data is practically the same as that after the change. Accordingly, the time passing until the image lag amount in offset data corresponding to each operation mode becomes smaller than an allowable value after the completion of irradiation practically follows the operation mode, and, if the operation mode is changed midway along the operation, practically follows the changed operation mode.

(Example of Offset Data Obtaining Method)

Referring to FIG. 3 again, offset data is obtained for each of the plurality of modes in S110 as described above. According to FIGS. 4 and 5, the time passing until the image lag amount in offset data becomes smaller than an allowable value after the completion of irradiation shortens as the frame rate increases, and prolongs as the frame rate decreases.

In S110, therefore, offset data corresponding to each operation mode and having a sufficiently reduced image lag is obtained in order from the one corresponding to the high frame rate. That is, after irradiation to the sensor array 110 is complete, offset data corresponding to the high frame rate is first obtained and held in the holding unit 150, and offset data corresponding to the low frame rate is obtained and held in the holding unit 150 after that. This makes it possible to shorten the time required to obtain offset data corresponding to each operation mode. This is particularly advantageous when updating offset data in S150 (see FIG. 3).

Figure 6:
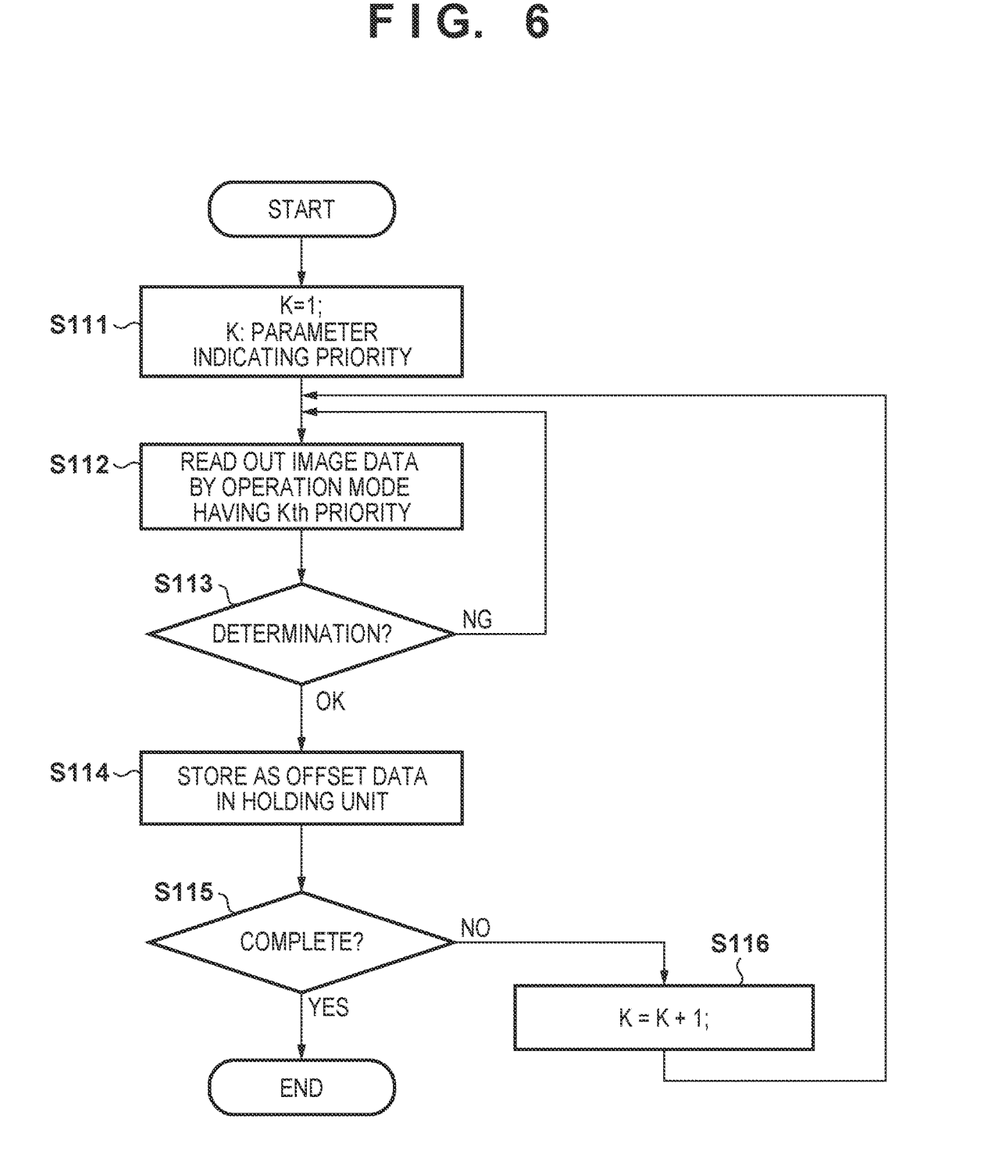
FIG. 6 is a flowchart for obtaining offset data.

FIG. 6 is a flowchart for explaining an example of the offset data obtaining method corresponding to each operation mode. In S111, K=1 is set as a parameter K indicating priority.

In S112, while the sensor array 110 is not irradiated, image data is read out from the sensor array 110 by an operation mode having the Kth priority (in this case, an operation mode having the first priority because K=1).

In S113, whether an image lag amount in the image data read out in S112 is smaller than an allowable range is determined. If the image lag amount is smaller than the allowable value (if OK), the process advances to S114. If the image lag amount is larger than the allowable value (if NG), the process returns to S112. In this determination step, image data having an image lag amount smaller than the allowable value is obtained from the image data read out in S112.

The determination step in S113 may also be performed in accordance with, for example, whether each signal value forming the image data read out in S112 satisfies a predetermined reference. For example, this determination step may also be performed based on whether each signal value is smaller than a reference value. As another example, this determination step may also be performed based on whether the difference between signal values from two sensors PX adjacent to each other in the sensor array 110 is smaller than another reference value. As still another example, this determination step may also be performed based on the mean, median, mode, standard deviation, or the like of signal values from the plurality of sensors PX. Furthermore, this determination step may also be performed by another known method of determining the presence/absence of an image lag in image data.

In S114, the image data found to have an image lag amount smaller than the allowable value in S113 is held as offset data in the holding unit 150. Although image data of one frame can be used as this offset data, it is also possible to use image data (for example, image data having undergone addition and averaging) calculated based on image data of two or more frames (for example, 30 frames).

In other words, S112 and S113 are steps of reading out image data from the sensor array 110 by the operation mode having the Kth priority while the sensor array 110 is not irradiated, and simultaneously monitoring whether an image lag in the image data falls within an allowable range. Also, S114 is a step of employing image data having an image lag falling within the allowable range in steps S112 and S113 as offset data for the operation mode having the Kth priority, and holding the image data in the holding unit 150.

In this embodiment, S112 and S113 when K=1 are equivalent to a first sub step of the present invention, and control performed for this step by the controlling unit 170 is equivalent to first sub control of the present invention. Also, S114 when K=1 is equivalent to a second sub step of the present invention, and control performed for this step by the controlling unit 170 is equivalent to second sub control of the present invention. A step including the first and second sub steps is equivalent to a first step of the present invention, and control performed for the first step by the controlling unit 170 is equivalent to first control of the present invention. Furthermore, S112 and S113 when K≥2 are equivalent to a third sub step of the present invention, and control performed for this step by the controlling unit 170 is equivalent to third sub control of the present invention. Also, S114 when K≥2 is equivalent to a fourth sub step of the present invention, and control performed for this step by the controlling unit 170 is equivalent to fourth sub control of the present invention. A step including the third and fourth sub steps is equivalent to a second step of the present invention, and control performed for the second step by the controlling unit 170 is equivalent to second control of the present invention.

Note that in order to reduce the number of times of the determination step in S113, the resetting process may also be performed once or more for each sensor PX in the sensor array 110 prior to S112. The number of times of this resetting process can be set based on the time required for an image lag amount in image data to become smaller than the allowable value.

In S115, whether the operation of obtaining offset data is complete for all modes is determined. If the operation is not complete, the process advances to S116. If the operation is complete, this process is terminated. In this case since K=1, then the process advances to step S116. In S116, 1 is added to K (K=2 is set), and the process returns to S112 (S112 to S114 are performed for an operation mode having the second priority). This applies to K=3 and subsequent values. S115 may also be performed in accordance with whether K=L when the number of operation modes is L. For example, the process advances to S116 if K<L, and can be terminated if K=L.

As described previously, offset data for each operation mode can be obtained in order from the one corresponding to the high frame rate. Therefore, the order of obtaining offset data for each operation mode may also be predetermined. For example, offset data for each operation mode can be obtained in order based on a reference table defining the above-described priority K.

Also, when the readout unit 130 has two or more modes having the same frame rate, a mode for which offset data is to be read out first can be determined based on another parameter. The other parameter includes, for example, the binning number (pixel addition number) of a signal from each sensor PX, the signal amplification factor (gain) of the readout unit 130, and the number (field size) of sensors PX as signal readout targets of the plurality of sensors PX.

When binning is performed, a signal component equivalent to an image lag amount is superposed. Therefore, an image lag is seen more clearly when the binning number is large than when it is small. When the readout unit 130 has two or more modes having the same frame rate, therefore, it is favorable to first read out offset data for a mode having a smaller binning number.

Furthermore, the readout unit 130 amplifies a signal component equivalent to an image lag. Accordingly, an image lag is seen more clearly when the signal amplification factor of the readout unit 130 is large than when the signal amplification factor of the readout unit 130 is small. When the readout unit 130 has two or more modes having the same frame rate, therefore, it is favorable to first read out offset data for a mode in which the signal amplification factor of the readout unit 130 is small.

In addition, electric charge (a change amount equivalent to an image lag amount) remaining in each sensor PX can be reduced by reading out a signal from the pixel PX. If offset data for a mode in which the readout target number of the sensor PX is small is read out first, therefore, an artifact (the influence of the readout) may occur in offset data read out after that for a mode in which the readout target number is large. Accordingly, when the readout unit 130 has two or more modes having the same frame rate, it is preferable to first read out offset data for a mode in which the readout target number of the sensor PX is large.

The order of reading out offset data can be determined by preferentially taking account of one of the binning number, the signal amplification factor of the readout unit 130, and the readout target number of the sensor PX described above, by which the influence of an image lag is large. For example, when the readout unit 130 has two or more modes having the same frame rate, the offset data readout order can be determined based on the binning number if the binning numbers of the two or more modes are different. Also, if the two or more modes are equal in binning number and different in signal amplification factor of the readout unit 130, the offset data readout order can be determined based on the signal amplification factor of the readout unit 130. If the two or more modes are equal in binning number and signal amplification factor of the readout unit 130 and different in readout target number of the sensor PX, the offset data readout order can be determined based on the readout target number.

(Others)

Several preferred embodiments have been exemplified above, but the present invention is not limited to them, and it is possible to partially change these embodiments and combine the features of the embodiments without departing from the scope and spirit of the invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-120550, filed on Jun. 15, 2015, which is hereby incorporated by reference herein in its entirety.

What is claimed is:

1. A radiation imaging apparatus comprising:
a sensor array, on which a plurality of sensors are arrayed, configured to detect radiation;
readout circuitry configured to read out image data, based on signals from the plurality of sensors, from the sensor array, the readout circuitry including, as operation modes, a first mode of reading out image data of one frame in a first period, and a second mode of reading out image data of one frame in a second period shorter than the first period;
one or more processors; and
one or more memories configured to hold image data and storing instructions that, when executed by the one or more processors, cause the radiation imaging apparatus to:
perform, after irradiation to the sensor array is complete, first control which causes the readout circuitry in the second mode to read out image data while the sensor array is not irradiated, to update image data already held by the one or more memories as offset data for the second mode by using the former offset data, and
perform, after the first control is performed, second control which causes the readout circuitry in the first mode to read out image data while the sensor array is not irradiated, to update image data already held by the one or more memories as offset data for the first mode by using the former offset data.

2. The radiation imaging apparatus according to claim 1, wherein the instructions, when executed by the one or more processors, cause the radiation imaging apparatus to:
in performing the first control:
perform first sub control which, after irradiation to the sensor array is complete, causes the readout circuitry to read out image data in the second mode from the sensor array while the sensor array is not irradiated, and simultaneously monitors whether an image lag in the readout image data falls within an allowable range; and
perform second sub control which causes the one or more memories to hold, as offset data for the second mode, image data found by the first sub control to have an image lag falling within the allowable range, and
in performing the second control:
perform third sub control which, after the first control, causes the readout circuitry to read out image data in the first mode from the sensor array while the sensor array is not irradiated, and simultaneously monitors whether an image lag in the readout image data falls within the allowable range; and
perform fourth sub control which causes the one or more memories to hold, as offset data for the first mode, image data found by the third sub control to have an image lag falling within the allowable range.

3. The radiation imaging apparatus according to claim 2, wherein the instructions, when executed by the one or more processors, further cause the radiation imaging apparatus to perform a correction process on image data read out in one of the first mode and the second mode by the readout circuitry from the irradiated sensor array, by using offset data for the one of the first mode and the second mode from the offset data held in the one or more memories.

4. The radiation imaging apparatus according to claim 2, wherein:
the sensor array includes the plurality of sensors arranged on a substrate and each including a detecting element configured to detect radiation and a transistor connected to the detecting element,
the instructions, when executed by the one or more processors, further cause the radiation imaging apparatus to accumulate electric charge in the detecting element by turning off the transistor, and output the accumulated electric charge by turning on the transistor thereafter,
the readout circuitry reads out image data corresponding to an amount of the output electric charge, and a charge accumulation time in the second mode is shorter than that in the first mode.

5. The radiation imaging apparatus according to claim 2, wherein in each of an operation from the first sub control to the second sub control and an operation from the third sub control to the fourth sub control,
the instructions, when executed by the one or more processors, further cause the radiation imaging apparatus to:
perform a first operation which causes the readout circuitry to read out image data from the sensor array while the sensor array is not irradiated, and
employ the image data obtained by the first operation as offset data if each signal value forming the image data satisfies a predetermined reference, and perform the first operation again if each signal value forming the image data does not satisfy the predetermined reference.

6. The radiation imaging apparatus according to claim 1, wherein the instructions, when executed by the one or more processors, further cause the radiation imaging apparatus to update offset data held in the one or more memories if a predetermined condition is satisfied.

7. The radiation imaging apparatus according to claim 6, wherein the predetermined condition includes a condition that a predetermined time elapses since offset data is held in the one or more memories or offset data in the one or more memories is lastly updated.

8. The radiation imaging apparatus according to claim 6, further comprising a temperature sensor,
wherein the predetermined condition includes a condition that a change amount of a measurement value of the temperature sensor obtained since offset data is held in the one or more memories or offset data in the one or more memories is lastly updated is larger than a predetermined value.

9. The radiation imaging apparatus according to claim 8, wherein the temperature sensor is arranged in the sensor array or a vicinity thereof.

10. The radiation imaging apparatus according to claim 1, wherein
the readout circuitry includes, as operation modes, not less than three modes including the first mode, the second mode, and another mode different therefrom, and
the instructions, when executed by the one or more processors, further cause the radiation imaging apparatus to cause the readout circuitry to read out offset data in each operation mode in order from one corresponding to a mode in which a period required to read out image data of one frame is shortest of the not less than three modes.

11. The radiation imaging apparatus according to claim 10, wherein
the sensor array includes a plurality of sensors arranged on a substrate, and
the instructions, when executed by the one or more processors, further cause the radiation imaging apparatus, if there are not less than two modes equal in period required to read out image data of one frame and different in binning number of a signal from each sensor, to determine for which one of the not less than two modes offset data is to be read out first, based on the binning number.

12. The radiation imaging apparatus according to claim 10, wherein the instructions, when executed by the one or more processors, further cause the radiation imaging apparatus, if there are not less than two modes equal in period required to read out image data of one frame and different in signal amplification factor of the readout circuitry, to determine for which one of the not less than two modes offset data is to be read out first, based on the signal amplification factor.

13. The radiation imaging apparatus according to claim 10, wherein
the sensor array includes a plurality of sensors arranged on a substrate, and
the instructions, when executed by the one or more processors, further cause the radiation imaging apparatus, if there are not less than two modes equal in period required to read out image data of one frame and different in number of sensors as signal readout targets of the plurality of sensors, to determine for which one of the not less than two modes offset data is to be read out first, based on the number of sensors as the signal readout targets.

14. The radiation imaging apparatus according to claim 10, wherein
the sensor array includes a plurality of sensors arranged on a substrate, and
the instructions, when executed by the one or more processors, further cause the radiation imaging apparatus, if there are not less than two modes equal in period required to read out image data of one frame, to determine for which one of the not less than two modes offset data is to be read out first, based on:
a binning number of a signal from each sensor if the not less than two modes are different in binning number,
a signal amplification factor of the readout circuitry if the not less than two modes are equal in binning number and different in signal amplification factor of the readout circuitry, and
a number of sensors as signal readout targets of the plurality of sensors if the not less than two modes are equal in both binning number and signal amplification factor and different in number of sensors.

15. A control method of a radiation imaging apparatus, the method comprising:
detecting radiation using a sensor array, on which a plurality of sensors are arrayed;
reading out image data using readout circuitry, based on signals from the plurality of sensors, from the sensor array, wherein reading out image data includes a first mode of reading out image data of one frame in a first period, and a second mode of reading out image data of one frame in a second period shorter than the first period;
holding image data in one or more memories;
causing, after irradiation to the sensor array is complete, the readout circuitry in the second mode to read out image data while the sensor array is not irradiated, to update image data already held by the one or more memories as offset data for the second mode by using the former offset data; and
causing, after causing the one or more memories to hold the image data read out in the second mode, the readout circuitry in the first mode to read out image data while the sensor array is not irradiated, to update image data already held by the one or more memories as offset data for the first mode by using the former offset data.

* * * * *